(12) United States Patent
Kim et al.

(10) Patent No.: US 10,827,448 B2
(45) Date of Patent: Nov. 3, 2020

(54) REGISTRATION METHOD THROUGH NETWORK ACCESS BELONGING TO IDENTICAL PLMN IN WIRELESS COMMUNICATION SYSTEM, AND DEVICE THEREFOR

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/065,112

(22) PCT Filed: Nov. 10, 2017

(86) PCT No.: PCT/KR2017/012724
§ 371 (c)(1),
(2) Date: Oct. 12, 2018

(87) PCT Pub. No.: WO2018/088836
PCT Pub. Date: May 17, 2018

(65) Prior Publication Data
US 2019/0037516 A1    Jan. 31, 2019

Related U.S. Application Data

(60) Provisional application No. 62/419,971, filed on Nov. 10, 2016, provisional application No. 62/484,867, (Continued)

(51) Int. Cl.
*H04W 60/00* (2009.01)
*H04W 88/06* (2009.01)
(Continued)

(52) U.S. Cl.
CPC ......... *H04W 60/00* (2013.01); *H04W 60/005* (2013.01); *H04W 84/042* (2013.01); *H04W 84/12* (2013.01); *H04W 88/06* (2013.01)

(58) Field of Classification Search
CPC ..... H04W 48/18; H04W 76/10; H04W 36/14; H04W 60/00; H04W 88/06; H04W 60/05;
(Continued)

(56) References Cited

U.S. PATENT DOCUMENTS

| | | | |
|---|---|---|---|
| 2008/0287125 A1 | 11/2008 | Hind et al. | |
| 2011/0317560 A1* | 12/2011 | Aramoto | H04W 28/0268 370/235 |

(Continued)

FOREIGN PATENT DOCUMENTS

| | | |
|---|---|---|
| KR | 1020040041685 | 5/2004 |
| KR | 1020140015545 | 2/2014 |

(Continued)

OTHER PUBLICATIONS

PCT International Application No. PCT/KR2017/012724, Written Opinion of the International Searching Authority dated Mar. 9, 2018, 25 pages.
(Continued)

*Primary Examiner* — Quoc Thai N Vu
(74) *Attorney, Agent, or Firm* — Lee Hong Degerman Kang Waimey

(57) ABSTRACT

An embodiment of the present invention relates to a method for performing a registration through a first network access and a second network access by user equipment (UE) in a wireless communication system, the method comprising the steps of: performing a registration through a first network access by UE; and performing a registration through a second network access by the UE, wherein when the first network access and the second network access belong to an
(Continued)

identical public land mobile network (PLMN), the UE starts a registration through the second network access only after a registration procedure thereof through the first network access has been completed.

12 Claims, 13 Drawing Sheets

Related U.S. Application Data filed on Apr. 12, 2017, provisional application No. 62/489,466, filed on Apr. 25, 2017, provisional application No. 62/502,785, filed on May 8, 2017.

(51) Int. Cl.
*H04W 84/12* (2009.01)
*H04W 84/04* (2009.01)

(58) Field of Classification Search
CPC ... H04W 84/042; H04W 84/012; Y02D 70/12
See application file for complete search history.

(56) References Cited

U.S. PATENT DOCUMENTS

| | | | |
|---|---|---|---|
| 2012/0213140 A1* | 8/2012 | Olsson | H04W 8/08 370/311 |
| 2013/0035056 A1 | 2/2013 | Prasad et al. | |
| 2017/0332192 A1* | 11/2017 | Edge | H04W 64/00 |
| 2017/0374581 A1* | 12/2017 | Dao | H04W 76/40 |
| 2018/0199279 A1* | 7/2018 | Baek | H04W 48/18 |
| 2018/0352420 A1* | 12/2018 | Jactat | H04W 76/15 |
| 2020/0059989 A1* | 2/2020 | Velev | H04W 76/30 |

FOREIGN PATENT DOCUMENTS

| | | |
|---|---|---|
| KR | 1020150026982 | 3/2015 |
| WO | 2013119025 | 8/2013 |

OTHER PUBLICATIONS

European Patent Office Application Serial No. 17868856.0, Search Report dated Apr. 28, 2020, 10 pages.
Nokia et al., "23.501: Corrections in the AMF procedures for Non-3GPP", S2-172717, SA WG2 Meeting #120, Mar. 2017, 4 pages.
3rd Gerneration Partnership Project; Technical Specification Group Services and System Aspects; System Architecture for the 5G System; Stage 2 (Release 15), 3GPP TS 23.501 v0.4.0, Apr. 2017, 123 pages.
Qualcomm Incorporated, "23.502: Mobility management model for non-3GPP accesses: procedures", S2-170739, SA WG2 Meeting #S2-119, Feb. 2017, 12 pages.
LG Electronics, "TS 23.501: Description for initial registration", S2-173994, SA WG2 Meeting #121, May 2017, 3 pages.
LG Electronics, "TS 23.501 P-CR update to Registration Management", S2-171857, SA WG2 Meeting #120, Mar. 2017, 5 pages.
Samsung, "AMF selection for untrusted non-3gpp access", S2-170260, SA WG2 Meeting #118bis, Jan. 2017, 2 pages.

* cited by examiner (a)

(b)

(c)

REGISTRATION METHOD THROUGH NETWORK ACCESS BELONGING TO IDENTICAL PLMN IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/012724, filed on Nov. 10, 2017, which claims the benefit of U.S. Provisional Application Nos. 62/419,971, filed on Nov. 10, 2016, 62/484,867, filed on Apr. 12, 2017, 62/489,466, filed on Apr. 25, 2017, and 62/502,785, filed on May 8, 2017, the contents of which are all hereby incorporated by reference herein in their entirety.

TECHNICAL FIELD

The following description relates to a wireless communication system, and more particularly, to a registration method through a network access belonging to an identical PLMN (Public Land Mobile Network) and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide a registration procedure of a 3GPP access and a non-3GPP access, which belong to an identical PLMN.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for performing a registration through a first network access and a second network access by a user equipment (UE) in a wireless communication system comprises the steps of performing a registration through a first network access by the UE; and performing a registration through a second network access by the UE, wherein when the first network access and the second network access belong to an identical public land mobile network (PLMN), the UE starts the registration through the second network access only after the registration through the first network access is completed.

In one embodiment of the present invention, a UE (User Equipment) for performing a registration through a first network access and a second network access in a wireless communication system comprises a transceiving module; and a processor, wherein the processor performs a registration through a first network access, and performs a registration through a second network access, and when the first network access and the second network access belong to an identical public land mobile network (PLMN), the UE starts the registration through the second network access only after the registration through the first network access is completed.

Information allocated to the UE during the registration through the first network access may be used for an Access and Mobility Management Function (AMF) selection of the UE during the registration through the second network access.

The AMF selected from the information allocated during the registration through the first network access may be identical to AMF selected from the first network access as AMF of the UE.

The AMF selection of the UE may be performed by a next generation Node B (gNB) if the second network access is a 3GPP access, and may be performed by N3IWF (Non-3GPP InterWorking Function) if the second network access is a non-3GPP access.

The first network access and the second network access may be non-3GPP access and 3GPP access, respectively, or may be 3GPP access and non-3GPP access, respectively.

The non-3GPP access may be WLAN access.

The information allocated during the registration through the first network access may be ID information allocated from the AMF.

Advantageous Effects

According to the present invention, since a registration procedure of a 3GPP access and a non-3GPP access, which belong to an identical PLMN, may be controlled, it is efficient that an identical network function may be allocated for a UE. For this reason, authentication, mobility management, and session management for a UE registered through two different accesses may be supported by one network function comprehensively and efficiently.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
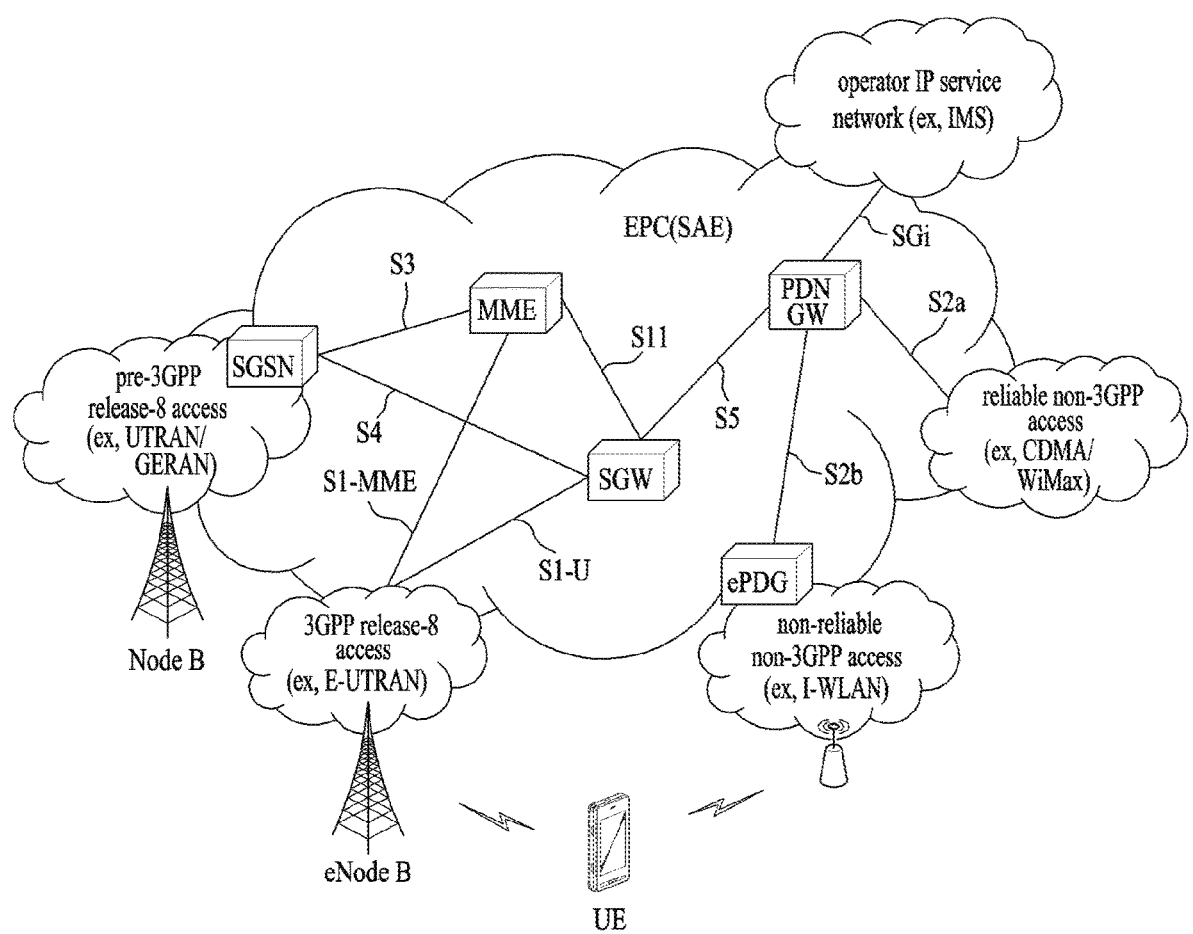
FIG. 1 is a diagram illustrating a brief structure of an evolved packet system (EPS) that includes an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communciation systems. For clarity, the description below centers on 3GPP LTE and 3GPP LTE-A, by which the technical idea of the present invention is non-limited.

Terms used in the present document are defined as follows:

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |

TABLE 1-continued

| Reference point | Description |
| --- | --- |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
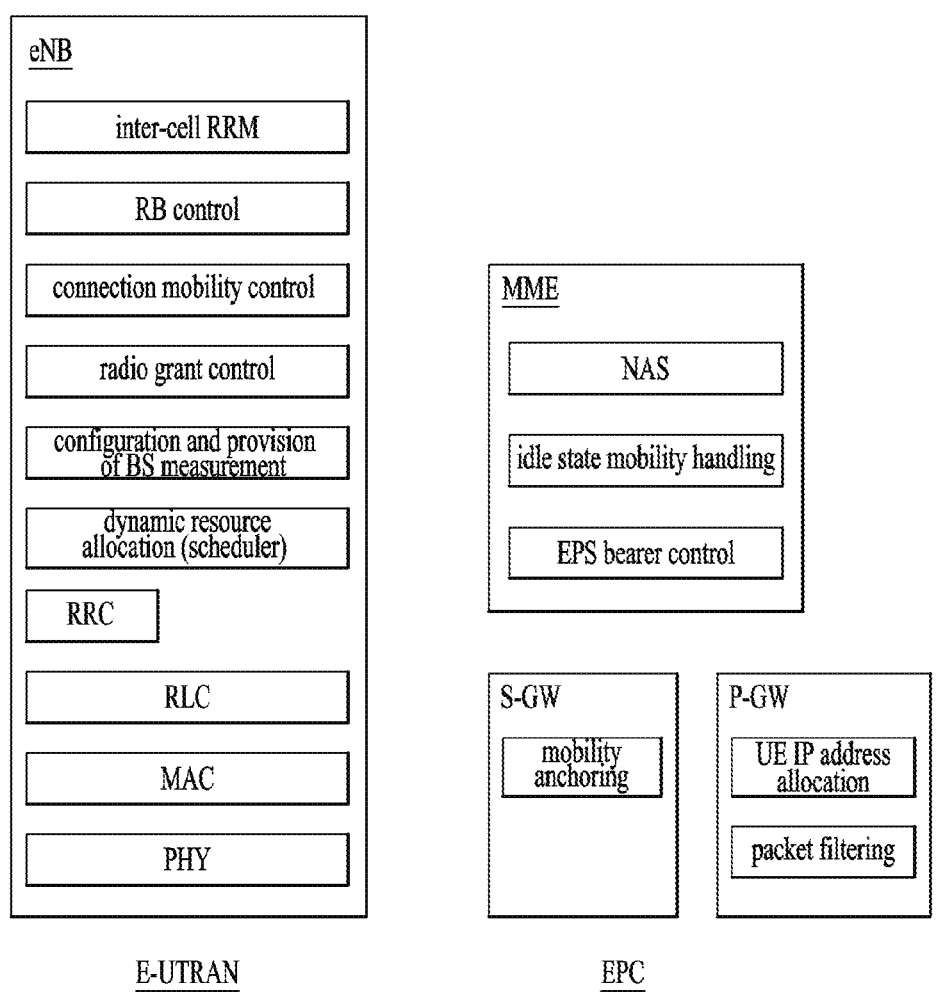
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
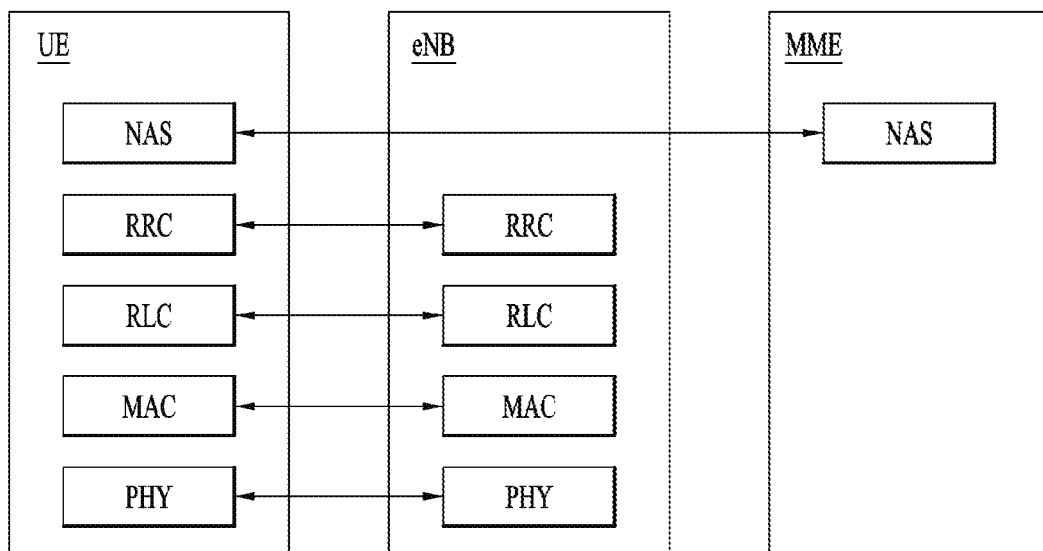
FIG. 3 is an exemplary diagram illustrating a structure of a radio interface protocol on a control plane.
Figure 4:
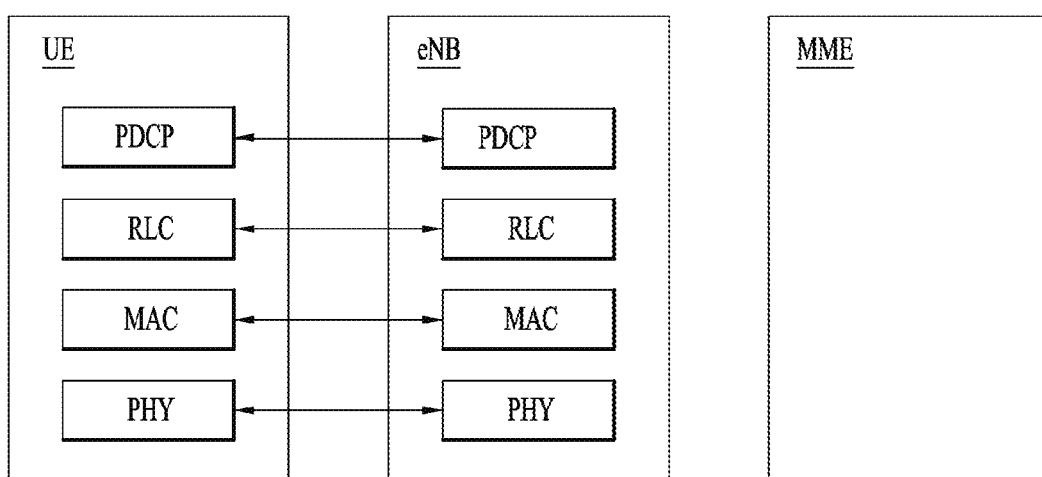
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel The MAC layer is connected with an RLC layer, which is a higher layer, through a logical channel The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
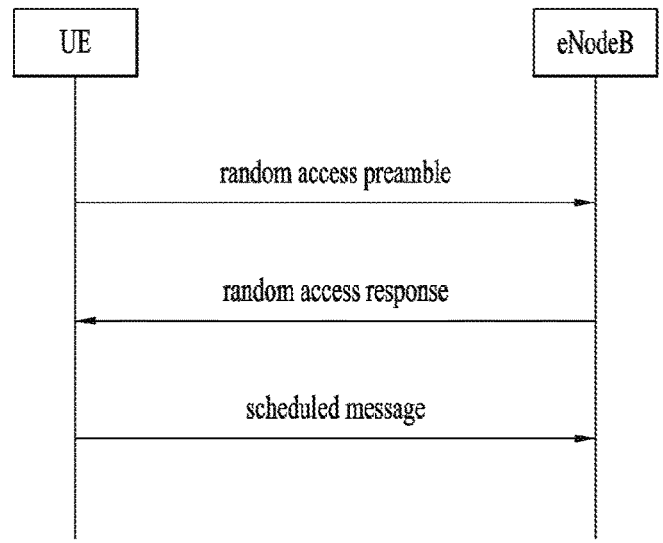
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
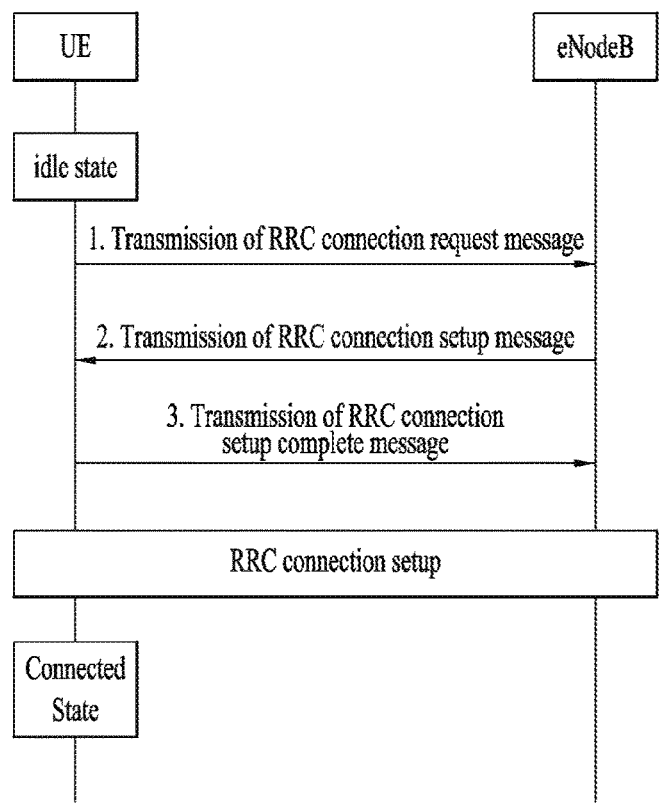
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
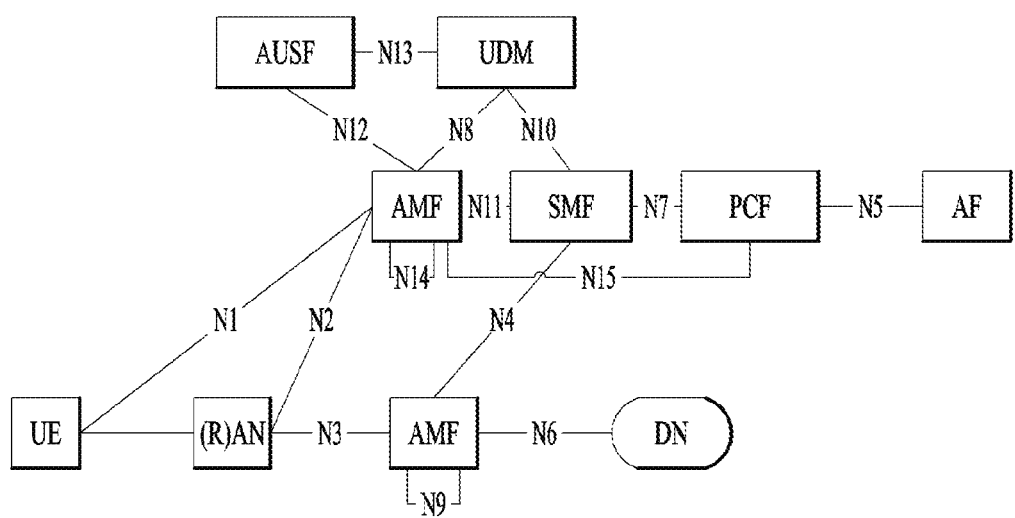
FIG. 7 illustrates a 5G system.

In the legacy EPC, MME is categorized into AMF(Core Access and Mobility Management Function) and SMF(session Management Function) in a Next Generation system (or 5G core network (CN)). Therefore, NAS interaction and MM (Mobility Management) with the UE are performed by the AMF, and SM (Session Management) is performed by the SMF. Also, the SMF manages a UPF (User plane Function) which is a gateway having a user-plane function, that is, for routing user traffic. In this case, a control-plane portion of S-GW and P-GW in the legacy EPC may be managed by the SMF, and a user-plane portion may be managed by the UPF. For routing of user traffic, one or more UPFs may exist between RAN and DN (Data Network). That is, the legacy EPC may be configured in 5G as illustrated in FIG. 7. Also, as a concept corresponding to PDN connection in the legacy EPS, a PDU (Protocol Data Unit) session is defined in the 5G system. The PDU session refers to association between a UE, which provides PDU connectivity services of Ethernet type or unstructured type as well as IP type, and a DN. In addition, a UDM (Unified Data Management) performs a function corresponding to HSS of EPC, and PCF (Policy Control Function) performs a function corresponding to PCRF of the EPC. To satisfy requirements of the 5G system, the functions may be provided in an enlarged type. Details of the 5G system architecture, each function and each interface follows TS 23.501. In the present invention, 5G and NextGen are used together to refer to the same meaning. Also, in case of a reference point, NGx (in this case, x is a number) and Nx are used together to refer to the same meaning. For example, NG1 and N1 mean the same reference point. Also, access, access network, and network access are used together to refer to the same meaning. For example, 3GPP access, 3GPP access network, and 3GPP network access are regarded as being identical to one another.

Figure 8:
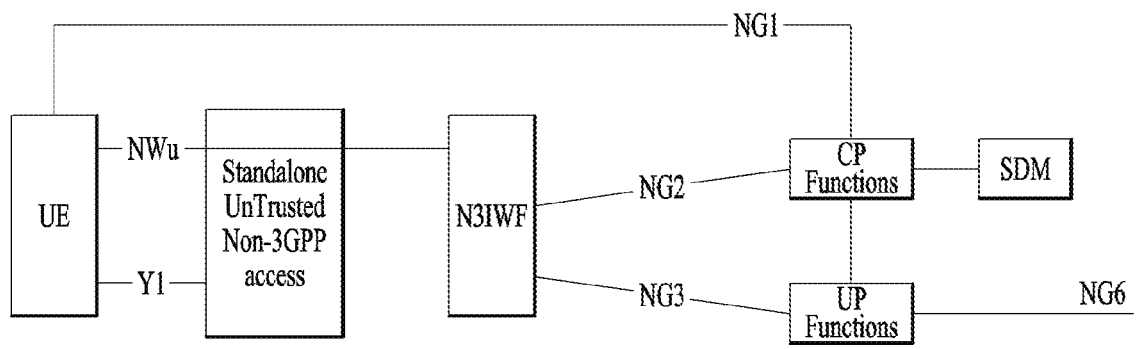
FIG. 8 is an example of a NextGen High-level architecture for a standalone untrusted non-3GPP access.

In respect of a common AN-CN (Access Network-Core Network) interface, Non-3GPP access may be embedded in NextGen RAN (non-standalone non-3GPP accesses), or may be arranged outside NextGen RAN (standalone non-3GPP accesses). The Standalone Non-3GPP access may support both a trusted Non-3GPP access and an untrusted Non-3GPP access. However, untrusted Non-3GPP accesses are only considered in 3GPP Release 15. Trusted Non-3GPP access may be considered in later release. NG2 (N2 in FIG. 7)/NG3 (N3 in FIG. 7) interfaces are used to connect the standalone Non-3GPP access to a CP(Control Plane) function and a UP(User Plane) function, respectively. It is assumed that a UE which accesses NextGen CN through Non-3GPP access uses 3GPP NextGen NAS signal. A High-level architecture as shown in FIG. 8 may be used for the Standalone untrusted Non-3GPP access. In respect of the Untrusted Non-3GPP access, a) the UE may discover and select N31WF as a procedure similar to ePDG selection of TS 23.402, b) the UE sets the selected N31WF and IPsec tunnel by using IKEv2 and is authenticated in the NextGen CN through NG2 in the middle of setting the IPsec tunnel, c) NAS message is exchanged between the UE and the CP function through the set IPsec tunnel and NG2 after authentication, and N3IWF transparently delivers the NAS message through NG2, d) IKEv2 and IPsec are used in an interface between the UE and N3IWF but additional protocol may be explicitly provided if necessary, and e) one IKE security relation may exist between the UE and N31WF regardless of the number of PDU sessions owned by the UE.

In respect of the NG-CP(NextGen Core-Control Plane) function, NRF(NF Repository Function) discovers peer NG-CP NFs and provides NF registration and search function to allow the peer NG-CP NFs to perform communication with each other. AMF(Access and Mobility Management Function) processes UE level access, which includes UE network access control, UE location management and UE reachability management, and mobility management. Also, the AMF supports that the UE accesses a network through multiple access types including 3GPP access and non-3GPP access. The AMF is an end terminal of NG1 reference point and NG2 reference point. SMF(Session Management Function) supports UE IP address allocation, user plane function selection and control. Also, the SMF may include a control part such as QoS related rule, session related billing, and legal blocking. The SMF controls NG user plane function through NG4. PCF(Policy Control Function) provides dynamic polices (QoS application, charging, access control, traffic routing, etc.) by interworking with other NG CP functions such as the SMF and the AMF. In addition, NEF(Network Capability Exposure Function) exists.

Figure 9:
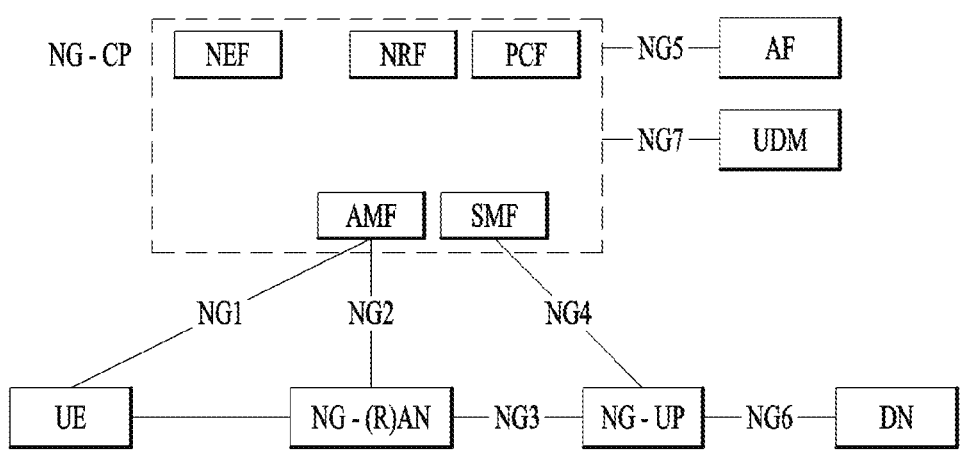
FIG. 9 illustrates a Non-Roaming NextGen Architecture.

A Non-Roaming NextGen Architecture is shown in FIG. 9. A reference point and interface are defined in FIG. 9 as follows. NG1 is a reference point for a control plane between NG UE and AMF, NG2 is a reference point for a control plane between NG-(R)AN and AMF, and NG3 is a reference point for a user plane between NG-(R)AN and NG-UP. Also, NG4 is a reference point between SMF and NG-UP function, NG5 is a reference point between PCF and Application Function, NG6 is a reference point between NG-UP and a data network. The data network may be a public or private data network outside a mobile communication provider, or may be a mobile communication provider data network. NG7 is a reference point between NG-CP function and NG unified data management (UDM), and a service based interface should be regarded to be exposed from NG-CP function (service may be paged through other NG-CP function) such as AMF, SMF, PCF, NRF, and NEF. Subsequently, referring to FIG. 9, UDM stores UE related data, for example, subscription, and policies (for example, QoS and billing), and NG-UP(NG Core User Plane) is a general user plane function for supporting various tasks and functions such as external PDU session point (for example, IP) of mutual connection, packet routing and transfer, traffic processing (for example, QoS application), anchor point (if possible) for Intra/Inter-RAT mobility, packet test and legal intercept (UP collection). Meanwhile, a plurality of NG-UP functions may be used to provide one PDU session.

Figure 11:
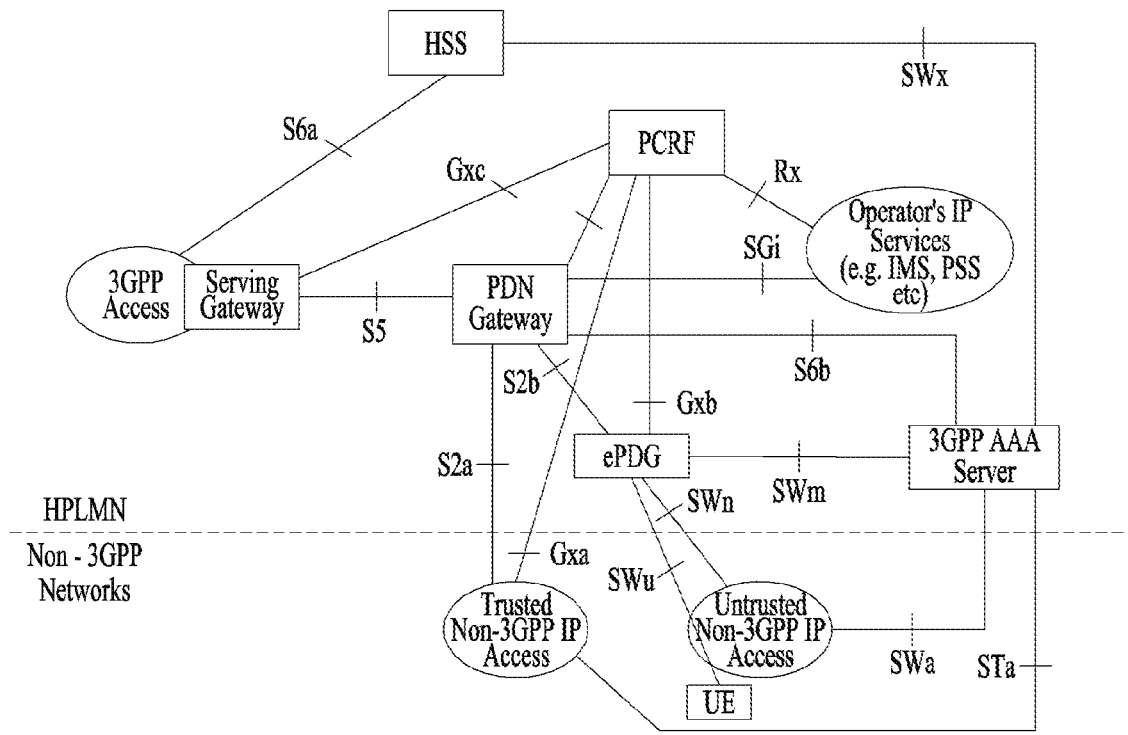
FIG. 11 illustrates a non-roaming structure in an EPS.

Registration procedures are shown in FIG. 11. For mobility tracking and reachability, the UE needs to register in a network to obtain authorization for receiving a service. The registration procedures may be performed when the UE needs to perform initial registration (this may be construed as attachment operation) for the 5G system, when mobility registration is updated due to a change of the UE to a new tracking area (TA) outside a registration area in an idle mode, when periodic registration update is performed (due to a preset inactivity interval), when the UE needs to update capabilities, or when a protocol parameter negotiated in the registration procedures is needed to be updated. A Permanent Equipment Identifier is acquired from the UE during initial registration. An AMF operator may identify PEI through EIR (Equipment Identity Register). The AMF delivers PEI (IMEISV) to UDM, SMF and PCF.

Figure 10:
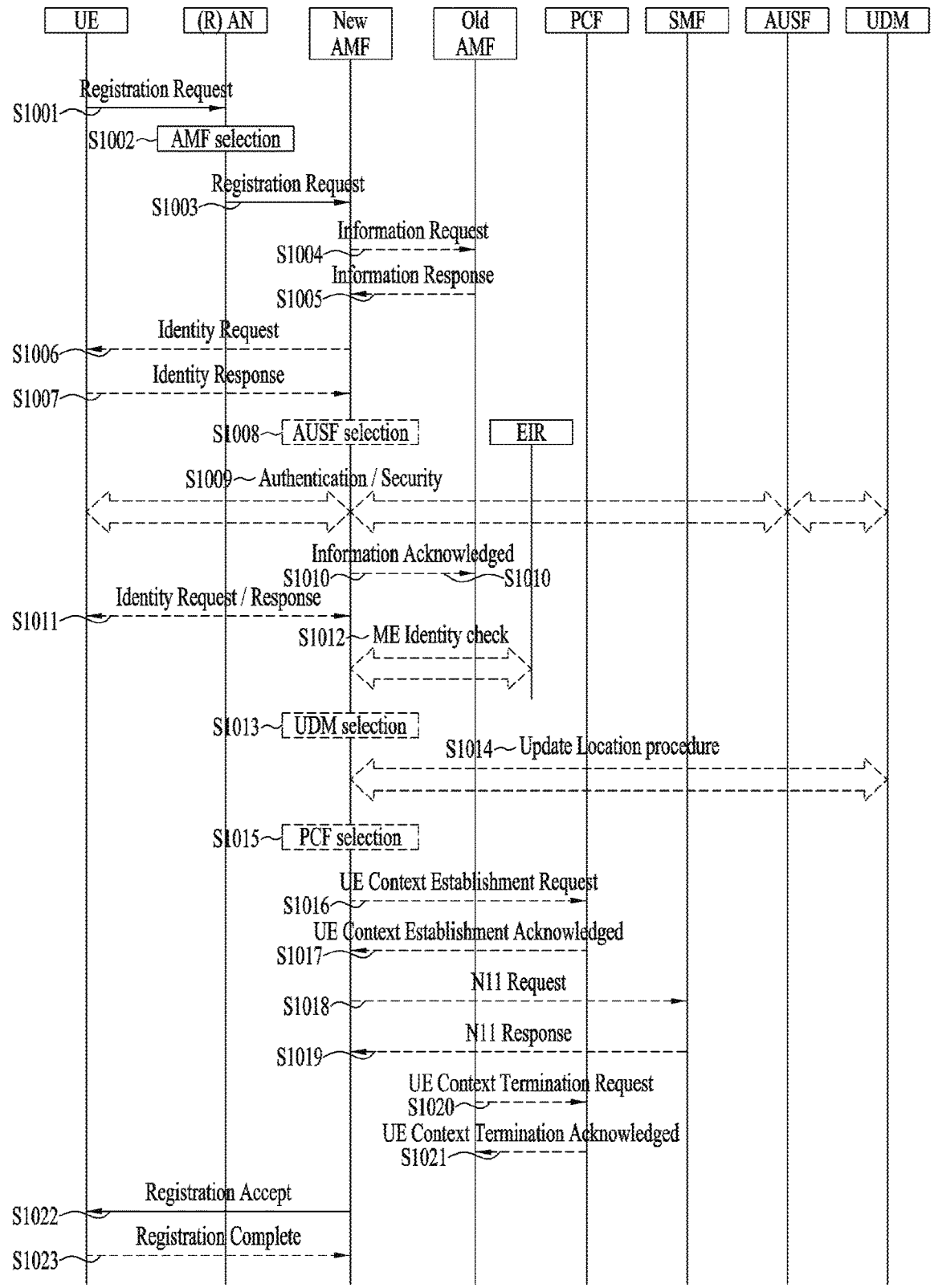
FIG. 10 illustrates registration procedures.

Subsequently, the registration procedure will be described with reference to FIG. 10. In step S1001, the UE transmits AN message (AN parameters, Registration Request (Registration type, SUPI(Subscriber/Subscription Permanent Identifier, subscriber permanent identifier) or Temporary User ID, Security parameters, NSSAI, UE 5GCN Capability, PDU session status and MICO mode preference)) to the (R)AN. In case of 5G-RAN, AN parameter includes SUPI or temporary user ID, selected network and NSSAI.

Registration type includes initial registration (that is, UE is in non-registration state. Therefore, attachment operation) of the UE, mobility registration update (that is, the UE is in registration state and starts a registration procedure due to mobility), or periodic registration update (that is, the UE is in a registration state and starts a registration procedure due to expiration of a periodic update timer). If included, temporary user ID indicates the last serving AMF. If the UE is already registered in PLMN of 3GPP access and another PLMN through non-3GPP access, the UE should not provide UE temporary ID allocated by the AMF during a registration procedure through non-3GPP access when transmitting a registration request. Security parameters are used for authentication and integrity protection. NSSAI indicates Network Slice Selection Assistance Information (defined in clause 5.15 of TS 23.501). A PDU session state indicates a PDU session available (previously set) in the UE.

In step S1002, if SUPI is included or temporary user ID does not indicate valid AMF, AMF is selected based on (R)AT and NSSAI. The (R)AN selects AMF as described in TS 23.501. If the (R)AN cannot select proper AMF, the (R)AN transmits a registration request to the AMF selected in accordance with a local policy. If the selected AMF cannot provide service to the UE, the selected AMF selects AMF suitable for the UE. Rearrangement between the basic AMF and the selected AMF is described in TS 23.502 4.2.2.2.3, and initial AMF refers to the basic AMF, and a target AMF refers to the selected AMF.

In step S1003, the (R)AN transmits, to a new AMF, N2 message (N2 parameter, Registration Request (registration type, subscriber permanent ID, or temporary user ID, security parameter, NSSAI and MICO mode reference)). When the 5G-RAN is used, the N2 parameter includes location information related to a cell in which the UE is camping, cell identifier, and RAT type. If the registration type displayed by the UE is periodic registration update, steps S1004 to S1017 may be omitted.

In step S1004, a (conditional) new AMF transmits an information request, that is, Information Request (complete Registration Request) to the old AMF. If the temporary user ID of the UE is included in the registration request and the serving AMF is changed after the last registration, the new AMF may transmit an information request, which includes a complete registration request IE, to the old AMF to request SUPI and MM context of the UE.

In step S1005, a (conditional) old AMF transmits an information response, that is, Information Response (SUPI, MM context, SMF information) to the new AMF. The old AMF responds to the new AMF as the information response which includes SUPI and MM context of the UE. If information on an active PDU session is included in a previous AMF, the old AMF includes SMF information, which includes SMF ID and PDU session ID, in the information on an active PDU session.

In step S1006, the (conditional) new AMF transmits an identity request, that is, Identity Request ( ) to the UE. If SUPI is not provided by the UE or not searched from the old AMF, the identity request procedure is initiated as the AMF transmits the identity request message to the UE.

In step S1007, a (conditional) UE transmits Identity Response ( ) to the new AMF. That is, the UE responds as an Identity Response message which includes SUPI.

In step S1008, the AMF may determine to invoke AUSF (Authentication Server Function). In this case, the AMF should select AUSF based on SUPI as described in TS 23.501.

In step S1009, the AUSF should initiate authentication of the UE and NAS security function.

In S1010, the (conditional) new AMF transmits Information Acknowledged ( ) to the old AMF. If the AMF is changed, the new AMF acknowledges delivery of UE MM context. If an authentication/security procedure is failed, registration is rejected, and the new AMF transmits a rejection mark to the old AMF. The old AMF continues to operate like that information request is not received.

In step S1011, the (conditional) new AMF transmits Identity Request ( ) to the UE. If PEI(Permanent Equipment Identifier) is not provided by the UE or not searched from the old AMF, the identity request procedure is initiated as the AMF transmits the identity request message to the UE to search for PEI.

In step S1012, the new AMF starts to identify ME (options). PEI checking is performed as described in clause 4.7 of TS 23.502.

In step S1013, if step S1014 is performed, the new AMF selects UDM on the basis of SUPI. The AMF selects UDM as described in TS 23.501.

In step S1014, if the AMF is changed after the last registration or if there is no valid subscription context for the UE in the AMF, or if the UE provides SUPI which does not refer to valid context from the AMF, the new AMF starts an update location procedure by means of UDM. This case includes an operation that UDM starts location cancellation to the old AMF.

In step S1015, the conditional new AMF selects PCF on the basis of SUPI. The AMF selects PCF as describe in TS 23.501.

In step S1016, an (optional) new AMF transmits UE Context Establishment Request ( ) to the PCF. The AMF requests the PCF to apply operator policies for the UE.

In step S1017, the PCF transmits UE Context Establishment Acknowledged ( ) to the new AMF. That is, the PCF acknowledges and responds UE Context Establishment Request message.

In step S1018, the (conditional) new AMF transmits N11 Request ( ) to the SMF. If the AMF is changed, the new AMF notifies each SMF of a new AMF which serves the UE. The AMF verifies a PDU session state from the UE by using available SMF information. The AMF receives SMF information available if the AMF is changed from the previous AMF. The new AMF requests the SMF to release a network resource related to a PDU session which is not activated in the UE.

In step S1019, the SMF transmits N11 Response ( ) to the new AMF. The SMF may determine to trigger UPF rearrangement, for example. If a registration type marked by the UE is periodic registration update, steps 1020 and 1021 may be omitted.

In step S1020, the (conditional) old AMF transmits UE Context Termination Request ( ) to the PCF. If the previous AMF is requested such that UE context is previously set by the PCF, the old AMF ends UE context in the PCF.

In step S1021, the PCF transmits UE Context Termination Acknowledged ( ) to the old AMF.

In step S1022, the new AMF transmits, to the UE, Registration Accept (Temporary User ID, Registration area, Mobility restrictions, PDU session status, NSSAI, Periodic registration update timer, LADN Information and accepted MICO mode). If the AMF allocates new temporary user ID, the temporary user ID is included in the registration accept. If mobility restrictions are applied to the UE, mobility restrictions are included in the registration accept. The AMF indicates a PDU session state for the UE. The UE cancels a random internal resource related to a PDU session which is not displayed as active from the received PDU session state. If the PDU session state information exists in the Registration Request, the AMF should display the PDU session state for the UE. NSSAI includes accepted S-NSSAI(Single Network Slice Selection Assistance Information). If UE subscription data include subscribed LADN(Local Area Data Network) identification information, the AMF should include LADN information on LADN defined in TS 23.501 5.6.5 available in a registration area determined by the AMF in the registration accept message. If the UE includes MICO(Mobile Initiated Connection Only) mode in the request, the AMF responds as to whether the MICO mode should be used.

In step S1023, the (conditional) UE transmits Registration Complete ( ) to the new AMF. If new temporary user ID is allocated, the UE transmits Registration Complete message to the AMF to identify the new temporary user ID.

Hereinafter, a method for efficiently processing attachment of a UE through 3GPP access and non-3GPP access (main example includes WLAN access, which includes both trusted WLAN and untrusted WLAN) in a 3GPP Next Generation system (NGS or NG System: next generation, called 5G mobile communication system) will be described.

A non-roaming structure within an EPS is shown in FIG. 11. As shown in FIG. 11, if a UE is connected to an EPC through WLAN access, there is no NAS MM procedure as compared with connection to EPC through 3GPP access. Therefore, a network function for managing MM context does not exist. However, if the UE is connected to NG core network through WLAN access, the UE and the core network need to perform NAS attachment procedure, and thus the AMF needs to manage/maintain MM context of the UE with respect to the WLAN access.

Figure 12:
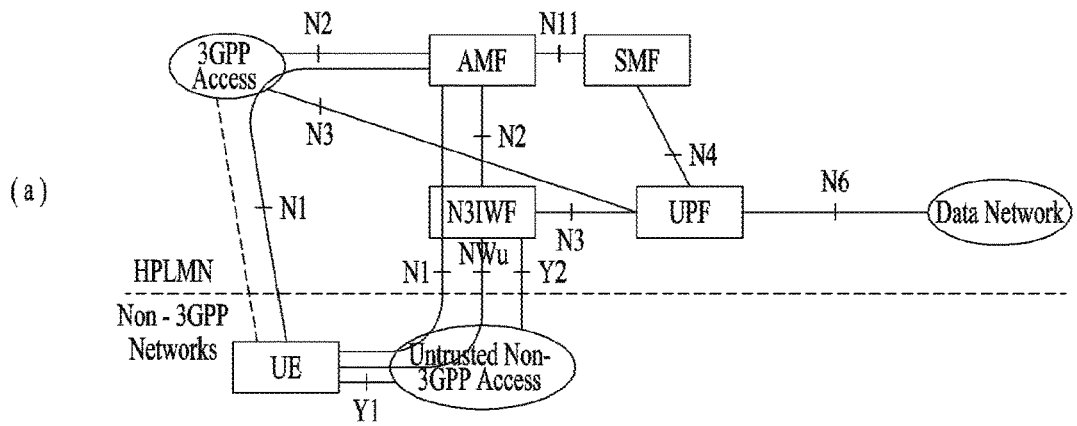
FIG. 12 illustrates various examples that a UE is connected to an NG core network through non-3GPP access such as WLAN access and 3GPP access.
Figure 12:
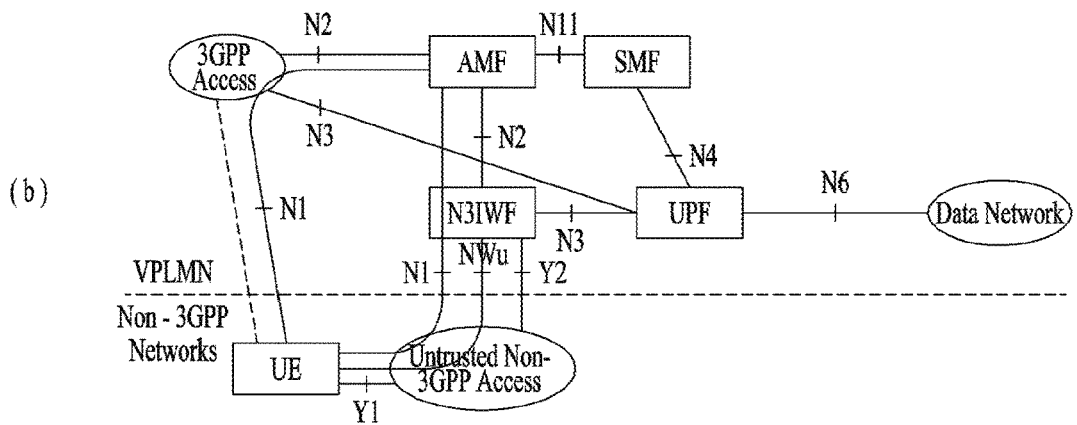
Figure 12:
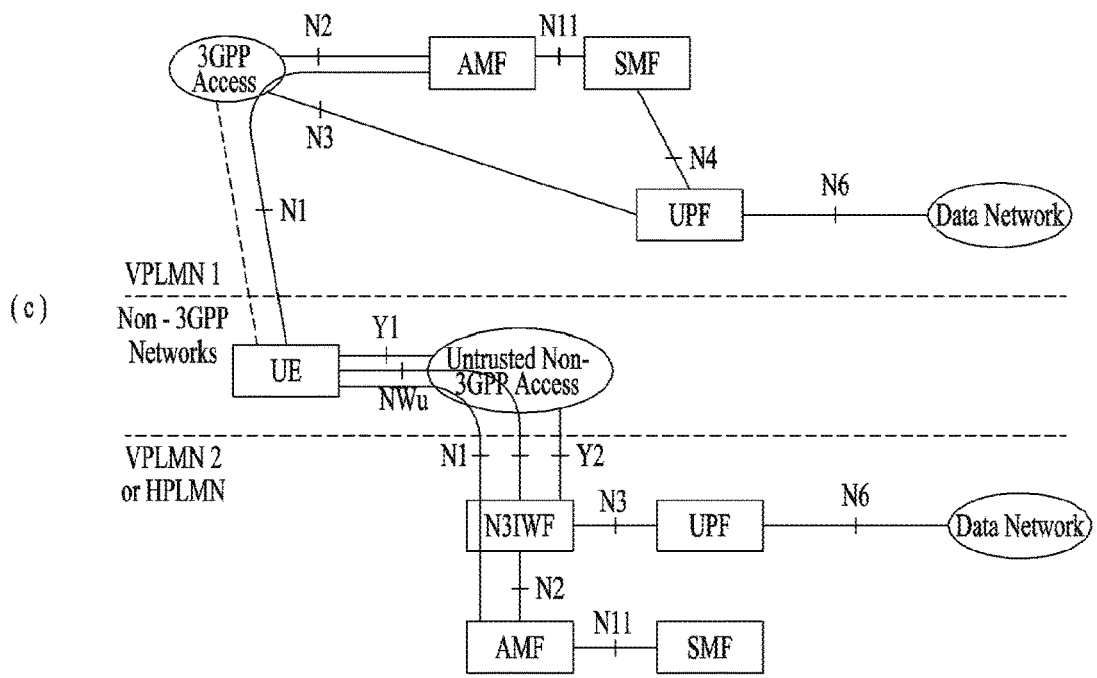

FIG. 12 illustrates various scenarios that a UE is connected to an NG core network through non-3GPP access such as WLAN access and 3GPP access.

In FIG. 12(a), the UE is not roaming, and is connected to the NG core network through 3GPP access and non-3GPP access in a home PLMN. In FIG. 12(b), the UE is roaming, and is connected to the NG core network through 3GPP access and non-3GPP access (this may mean N3IWF), which belong to an identical visited PLMN. In FIG. 12(c), the UE is roaming, and is connected to the NG core network through 3GPP access which belongs to a visited PLMN#1 and at the same time connected to the NG core network through non-3GPP access (this may mean N3IWF) which belongs to a visited PLMN#2. Alternatively, the UE may be connected to the NG core network through 3GPP access which belongs to a Visited PLMN and at the same time connected to the NG core network through non-3GPP access (this may mean N3IWF) which belongs to a home PLMN. In this case, since the UE is connected to the NG core network through accesses which belong to their respective PLMNs different from each other, two NG core networks are connected, and AMF which serves the UE separately exists for each access.

Particularly, if the UE is simultaneously connected to the NG core network through 3GPP access and WLAN access, it is efficient for unified authentication, mobility management, and session management that the UE receives service from an identical AMF, that is, one AMF regardless of access type.

If the UE is connected (or attached or authenticated) to the NG core through one access and at the same time is connected (or attached or authenticated) to the NG core through another access, a problem may occur in that the identical AMF is not allocated/designated for various reasons. For example, in a state that the UE is connected (or attached or authenticated) to the NG core through a first access and the AMF is not determined, if the UE initiates connection (or attachment or authentication) to the NG core through a second access, respective AMFs different from each other may be allocated/designated with respect to the two accesses. For another example, in a state that the UE is connected (or attached or authenticated) to the NG core through a first access and information on the AMF is not updated in a DB (this may be referred to as various titles such as HSS, UDM(User Data Management), UDR(User Data Repository), and State DB) for managing/maintaining information on AMF, if the UE initiates connection (or attachment or authentication) to the NG core through a second access, respective AMFs different from each other may be allocated/designated with respect to the two accesses.

Therefore, in the embodiment of the present invention, a method for serving a UE from an identical AMF if the UE is connected to NG core network through 3GPP access and non-3GPP access will be described. This method may be construed as a method for enabling an identical AMF to process NAS message transmitted to or received from a UE connected to NG core network through 3GPP access and non-3GPP access regardless of a type of access.

Embodiment

A UE according to one embodiment of the present invention may perform registration through a first network access and perform registration through a second network access. In this case, if the first network access and the second network access belong to an identical PLMN(Public Land Mobile Network), the UE should initiate/start registration through the second network access after a registration procedure through the first network access is completed. In other words, if the first network access and the second network access belong to an identical PLMN, the UE does not initiate/start registration through the second network access until the registration procedure through the first network access is completed. Alternatively, if the first network access and the second network access belong to an identical PLMN, the UE delays registration initiation/start through the second network access until the registration procedure through the first network access is completed. If the first network access is 3GPP access, the second network access may be Non-3GPP access, and at this time, 3GPP access may include 5G New Radio and LTE for connecting UE to NG core network, and Non-3GPP access may be WLAN access. On the contrary, if the first access is non-3GPP access (e.g., WLAN access), the second access means 3GPP access. That is, the UE does not perform initial registration (or attachment) through 3GPP access and non-3GPP (that is, two accesses) simultaneously or concurrently. This may be construed that if the initial registration procedure is initiated (or is being performed) through one access, initial registration (or registration) is not initiated/performed through another access. Also, this may be construed that if the initial registration procedure is completed through one access, registration may be initiated/performed through another access. Also, this may be construed that if the initial registration procedure is performed through one access, (initial) registration through another access may be suspended. Termination of the initial registration may be construed as the time when the registration procedure is completed or the time when the UE receives a registration Accept message from the AMF. The registration procedure through 3GPP access and the registration procedure through non-3GPP access will be understood with reference to clause 4.2.2 (registration procedure) and clause 4.12.2 (registration via Untrusted non-3GPP access) of TS 23.502. In this case, the procedure may be construed as transaction or operation, and this is generally applied to the present invention.

In this way, registration through the second network access may be initiated only after the registration through the first network access is completed. Information allocated to the UE during registration through the first network access may be used for AMF section of the UE when registration through the second network access is performed. In more detail, AMF selected from the information allocated during registration through the first network access may be the same as AMF selected from the AMF of the UE through the first network access. That is, since a network function for designating/allocating AMF from the NG core network to the UE does not perform an attachment procedure simultaneously through different accesses, an identical AMF may be designated/allocated/selected for the UE. That is, the UE may recognize/determine/select a serving AMF of the UE when the UE is attached to the NG core network through the second network access, on the basis of information on AMF (that is, serving AMF) designated/allocated/selected when the UE is attached to the NG core network through the first network access. The network function for designating/allocating/selecting AMF to the UE may be a DB (this may be referred to as various titles such as HSS, UDM(User Data Management), UDR(User Data Repository), and State DB) for managing/maintaining information on AMF, or may be a function having a selection function of AMF. This is generally applied to the present invention. Examples of the function having a selection function of AMF include gNB and N3IWF(Non-3GPP InterWorking Function). That is, AMF selection of the UE may be performed by gNB and N3IWF. However, without limitation to this example, AMF selection may be performed by one or more various network functions.

Also, the information allocated during registration through the first network access may be ID information allocated from the AMF. In detail, information on AMF (that is, serving AMF) designated/allocated/selected when the UE is attached to the NG core network through the first network access may be based on temporary user ID of the UE, which is included during a registration request of the UE. This Temporary User ID may be allocated to the AMF when the UE performs registration to the NG core, and is defined as 5G-GUTI (5G Globally Unique Temporary Identity). Referring to clause 5.9.4 of TS 23.501, 5G-GUTI is configured as listed in Table 2 below. That is, 5G-GUTI includes GUAMI (Globally Unique AMF ID) which is identification information of the AMF which has allocated 5G-GUTI, that is, the serving AMF of the UE, and 5G-TMSI(5G Temporary Mobile Subscriber Identity) which is information that may identify a corresponding UE from the AMF.

TABLE 2

The 5G-GUTI shall be structured as:
    <5G-GUTI> := <GUAMI> <5G-TMSI>
    where GUAMI identifies the assigned AMF and 5G-TMSI identifies
    the UE uniquely within the AMF.
The Globally Unique AMF ID (GUAMI) shall be structured as:
    <GUAMI> := <MCC> <MNC> <AMF Region ID> <AMF Set
    ID> <AMF Pointer>
    where AMF Region ID identifies the region, AMF Set ID uniquely
    identifies the AMF Set within the AMF Region and AMF Pointer
    uniquely identifies the AMF within the AMF Set.
NOTE 2: The AMF Region ID addresses the case that there are more
    AMFsin the network than the number of AMFs that can be
    supported by AMF Set ID and AMF Pointer by enabling
    operators to re-use AMF the same Set IDs and AMF Pointers
    in different regions.

Meanwhile, the attachment procedure to the NG core network may be one of 1) an authentication procedure of the UE, 2) NAS attachment procedure of the UE, and 3) authentication and NAS attachment procedure. These procedures will be described in due order.

The authentication procedure of the UE may be a procedure of authenticating the UE in the NG core network in case of WLAN access, and may be EAP procedure. In case of the EAP procedure, if EAP-Success message is received from the network, it may be regarded that the authentication procedure is completed. In case of 3GPP access, although the UE may generally be authenticated through NAS attachment procedure, if authentication is performed separately, the authentication procedure may be performed. The authentication procedure may include even the case that authentication failure/rejection message is received from the network as authentication is failed.

In respect of NAS attachment procedure of the UE, if the UE receives an attachment Accept message from the network, it may be regarded that the NAS attachment procedure is completed. However, the NAS attachment procedure may include even the case that an attachment rejection message is received from the network as attachment is failed. Alternatively, if may be regarded that the NAS attachment procedure is completed only if all of messages are completely exchanged between the UE and the network. In the present invention, the NAS attachment procedure may be construed as an initial registration procedure or an initial registration update procedure or a registration procedure of initial registration type.

In case of the authentication and NAS attachment procedures of the UE, if the authentication procedure and the NAS attachment procedure of the UE are performed at the same time and then completed, it may be regarded that the attachment procedure to the NG core network is completed. This may generally correspond to the case that the UE has received attachment Accept message or attachment Reject message with respect to the NAS attachment procedure.

However, this may correspond to the case that the UE receives an authentication success/failure message or receives a response message to the NAS attachment and a response message to authentication.

An operation for initiating an attachment procedure to NG core network through a second network access after a UE completes the attachment procedure to the NG core network through a first network access (or operation for not performing initial registration simultaneously through two accesses) may be a rule which is to be always fulfilled by the UE. However, the operation may be applied if one or more of A) a condition that PLMN to which the first network access belongs is identical to PLMN to which the second network access belongs and B) a condition that the first network access is 3GPP access and the second network access is non-3GPP access and PLMN to which the first access network (or RAN or gNB) belongs is identical to PLNM to which N3IWF belongs are satisfied. If the condition A) and/or the condition B) is not satisfied, the UE may perform the attachment procedure to the NG core network through the first network access and the attachment procedure to the NG core network through the second network access in parallel.

Hereinafter, the embodiment of the present invention will be described in view of the network.

If the UE performs the attachment procedure to the NG core network through the second network access while performing the attachment procedure to the NG core network through the first network access (that is, in a state that the attachment procedure is not completed), the UE includes one or more of i) information indicating that the attachment procedure is being performed through another access, ii) access type information of another access which is performing the attachment procedure, iii) information indicating that the UE has no serving AMF yet, iv) information indicating that there is no ID (this may be temporary user ID) provided/allocated from the AMF (for reference, temporary user ID may include information (e.g., identifier) on AMF which has provided/allocated temporary user ID) when transmitting a connection request/related message to the network through the second network access. This information may be included in a complex type, and explicitly or implicitly.

In this case, the state that the attachment procedure to the NG core network is not completed means the state that it is not regarded that the attachment procedure to the NG core network is completed. Also, the information of iii) and iv) may be replaced with that temporary user ID is not included in the attachment request message.

The information of i) to iv) may be included in a) an authentication request/related message (this may be a first message transmitted from the UE to the NG core network (this may be construed as ngPDG and N3IWF, and may be construed as AMF), or not. This may be various in accordance with a protocol that includes the above information, for example, IKEv2 message, EAP message, etc.) and/or b) NAS attachment Request message (this may be construed as a request message for performing attachment or initial registration) transmitted from the UE to the network.

If the UE performs the attachment procedure to the NG core network through the second network access while performing the attachment procedure to the NG core network through the first network access, the operation for including the information may always be performed, or may be applied if one or more conditions of A) a case that PLMN to which the first network access belongs is identical to PLMN to which the second network access belong and B) a case that the first network access is 3GPP access and the second network access are non-3GPP access and PLMN to which the first network access (or RAN or gNB) belongs is identical to PLMN to which N3IWF belongs are satisfied.

If the network function (gNB, N3IWF or network node which performs a similar function) for designating/allocating/selecting AMF for the UE receives a connection request/related message to the network, which includes the aforementioned information i) to iv) or receives a message inquiring a serving AMF of the UE from another network function due to the connection request/related message, the network function identifies whether the serving AMF designated/allocated to the UE exists.

If the serving AMF exists (or if it is determined that the serving AMF exists), the corresponding serving AMF may be allowed to process the above message (or the UE). This may finally be construed that the designated/allocated/selected serving AMF serves the UE even though the corresponding serving AMF is connected to the network through the second network access as the UE is connected to the network through the first network access. In detail, the network function for designating/allocating/selecting the AMF designates/allocates/selects the serving AMF which is already designated/allocated/selected for the UE, whereby the identical AMF serves the UE regardless of access. If the network function receives a message for inquiring the serving AMF of the UE, the network function identifies the serving AMF already designated/allocated/selected for the UE and then responds to the inquiry by including the identified serving AMF.

If the serving AMF does not exist (or if it is determined that the serving AMF does not exist), since the corresponding serving AMF is not designated/allocated/selected in respect of connection to the first network access, the network function delays processing of the connection request/related message to the network, which is transmitted from the UE through the second network access, until the serving AMF is designated/allocated/selected.

Afterwards, if the serving AMF is designated/allocated/identified/selected for the UE, the connection request/related message to the network, which is transmitted from the UE through the second network access, may be processed by the corresponding serving AMF. This may finally be construed that the designated/allocated/selected serving AMF serves the UE even though the UE is connected to the network through the second network access as the UE is connected to the network through the first network access. In detail, if the network function for designating/allocating/selecting the AMF does not designate/allocate/select the serving AMF for the UE, the network function designates/allocates/selects the serving AMF, whereby the identical AMF serves the UE regardless of access. If the network function receives a message for inquiring the serving AMF of the UE, the network function identifies/selects the serving AMF, that is, acquires information on the serving AMF, and then responds to the inquiry. Alternatively, in response to the inquiry, the network function notifies that the serving AMF does not exist and then responds to the inquiry if the serving AMF is identified later.

Subsequently, the UE performs the attachment procedure to the NG core network through the second network access while performing the attachment procedure to the NG core network through the first network access (that is, in a state that the attachment procedure is not completed).

At this time, the UE may include the aforementioned information i) to iv) in the connection request/related message when transmitting the connection request/related message to the network through the second network access.

If the AMF is allocated/selected to serve the UE, the AMF registers in UDM that the AMF is a serving AMF of the corresponding UE. At this time, the AMF may additionally provide the UDM with one or more of I) the information (that is, the above information i) to iv)) received from the UE, II) a type of access (e.g., 3GPP access, non-3GPP access, etc.) through which the UE has performed registration, III) PLMN information to/in which the AMF belongs/is located: this may be inferred from ID information of the AMF. (If an identical AMF is allocated/selected for two accesses, the AMF may perform an operation for registering itself in the UDM as a serving AMF only once. At this time, the above information may not be provided to the UDM).

If the UDM receives a registration request for the serving AMF from the AMF, the UDM verifies whether the serving AMF of the corresponding UE has been already registered in different accesses and whether two AMFs belong to an identical PLMN if so.

If the serving AMF has been already registered in different accesses and two AMFs belong to an identical PLMN, the UDM instructs the AMF, which has requested registration of the serving AMF, to perform AMF change/redirection while providing information of the AMF which has been already registered. This instructions may be explicit or implicit. For example, the UDM may provide information on the AMF while notifying that the serving AMF already exists. Alternatively, the UDM may provide information on the AMF which is already registered while rejecting a registration request of the serving AMF.

In detail, the AMF which has received the instructions/information allows the AMF which is already serving the UE to serve the UE. This may include an operation for delivering the registration request message received by the AMF which has received the instructions/information to the AMF which is already serving the UE and/or an operation for delivering UE context information owned by/generated by the AMF which has received the instructions/information to the AMF which is already serving the UE. Also, this may include an operation for deleting a context generated for the corresponding UE if any. The AMF which is already serving the UE completes the registration procedure (this is a registration for the second network access).

For another example, the AMF which has received the instructions/information completes the registration procedure of the UE. At this time, the AMF inquires Temporary User ID for the UE of the AMF which has received the instructions/information from the UDM and acquires the Temporary User ID. When transmitting a registration response/Accept message (e.g., attachment Accept or registration Accept) to the UE in response to the registration request, the AMF includes the Temporary User ID in the registration response/Accept message. That is, the AMF which has received the registration request from the UE does not allocate Temporary User ID but the AMF which is already serving the UE receives Temporary User ID is previously allocated and transmits the received Temporary User ID to the UE. The AMF which has received the instructions/information may later perform an operation for delivering UE context information owned/generated by itself to the AMF which is already serving the UE. Also, the AMF may perform an operation for deleting a context generated for the corresponding UE if any.

Figure 13:
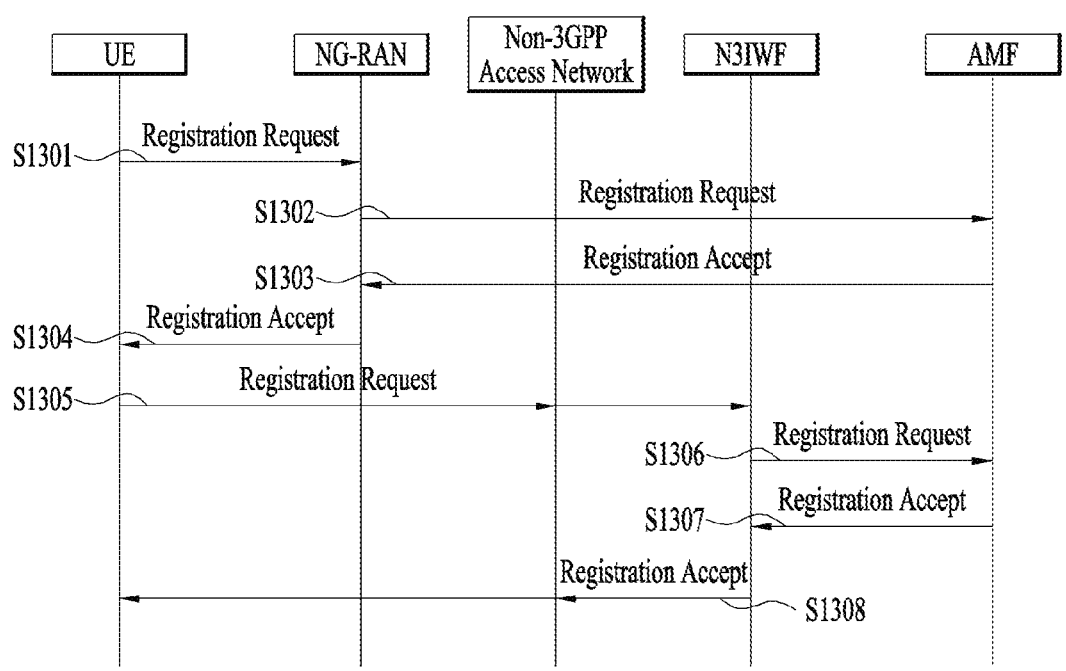
FIGS. 13 to 15 illustrate examples of a detailed registration procedure according to the embodiments of the present invention.
Figure 14:
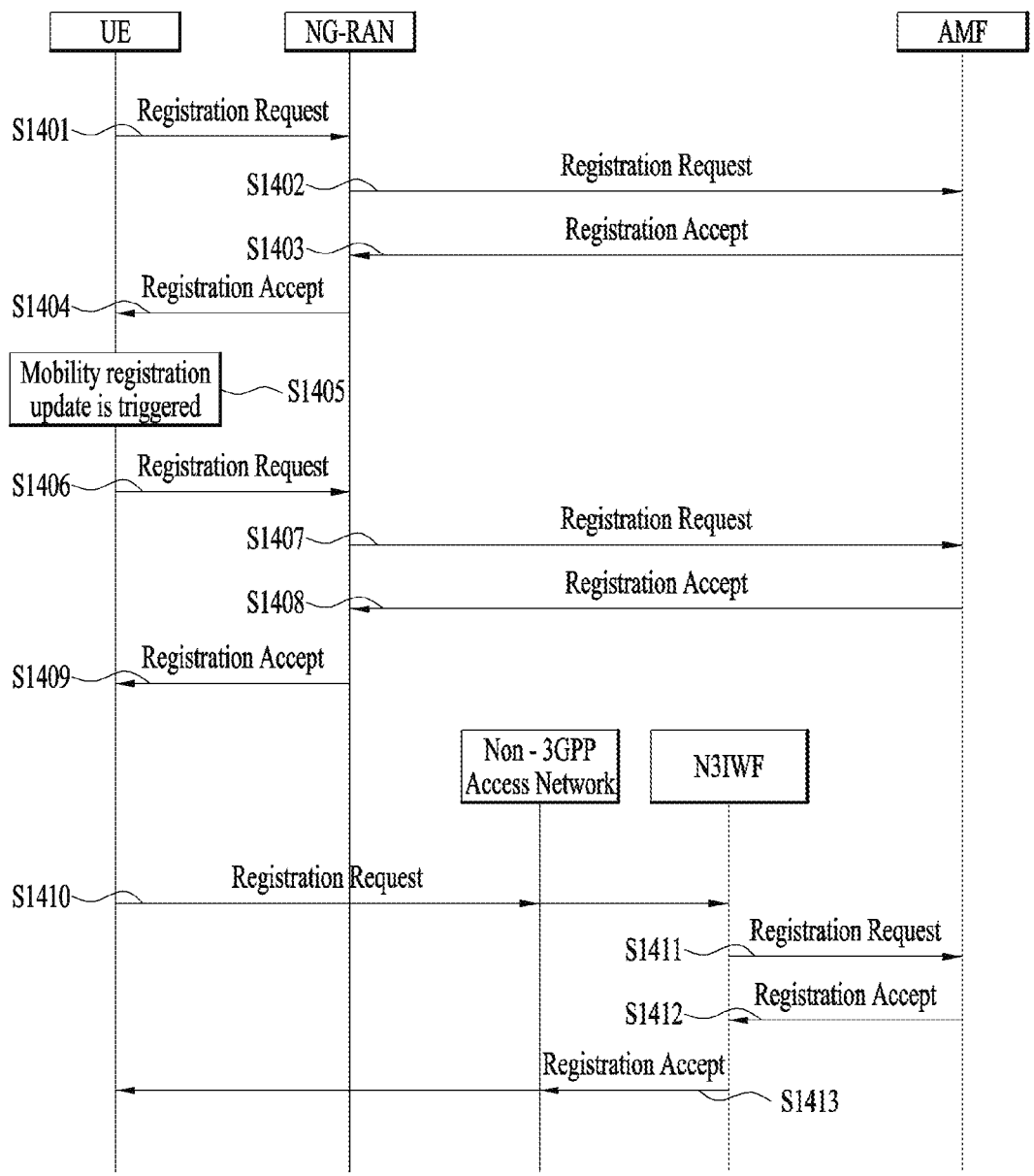
Figure 15:
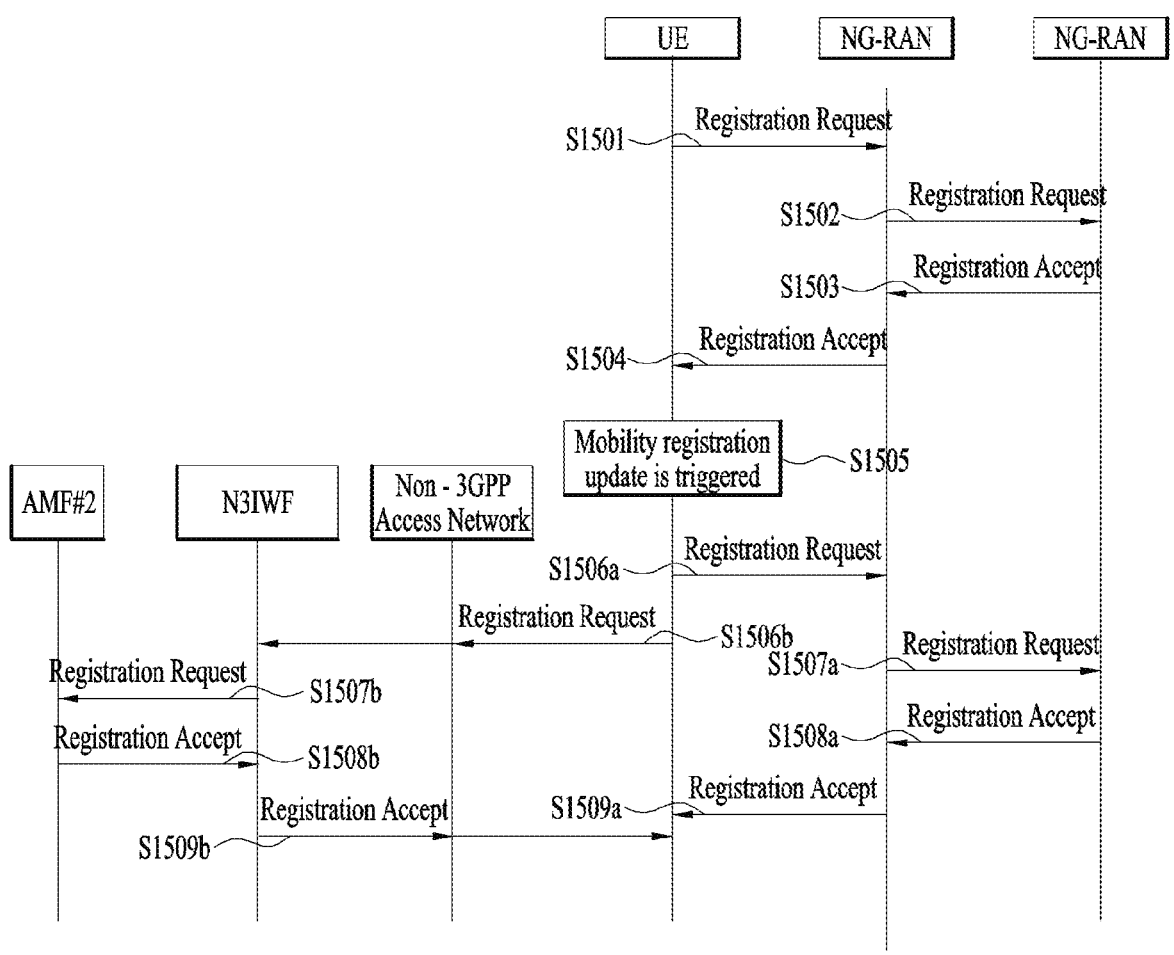

An example of a detailed registration procedure in respect of the aforementioned embodiments of the present invention is shown in FIGS. 13 to 15. An operation for forming a PDU session by means of the UE and an operation for transmitting and receiving traffic are not shown in the shown example, and will be understood with reference to TS 23.501 and TS 23.502. In the following description, NG-RAN is a RAN connected to the 5G core network through 3GPP access network, and may be 1) Standalone New Radio, 2) New Radio which is the anchor with E-UTRA extensions, 3) Standalone E-UTRA, and 4) E-UTRA which is the anchor with New Radio extensions, as described in TS 23.501. The NG-RAN may be referred to as RAN, or may be referred to as gNB connected to the 5G core network or eNB (or ng-eNB) connected to the 5G core network. Hereinafter, each case of FIGS. 13 to 15 will be described in detail.

FIG. 13 illustrates that 3GPP access and non-3GPP access (this may be construed as N3IWF which is generally applied to the present invention) through which the UE receives a service belong to an identical PLMN. In step S1301, the UE is powered on (that is, switched on). Therefore, the UE is intended to be connected to the 5G core network through 3GPP access. Also, the UE is intended to be connected to the 5G core network through non-3GPP access. Since 3GPP access and non-3GPP access belong to the identical PLMN, the UE first performs a registration to access at one side and then determines to perform a registration to access at the other side. In FIG. 13, it is assumed that the registration through 3GPP access is first performed. Of course, the registration through non-3GPP access may first be performed. In this case, steps S1305 to S1308 are first performed and then steps S1301 to S1304 are performed.

In step S1301, the UE transmits a registration request message to the 5G core network through NG-RAN. At this time, the registration request message may include SUPI (Subscriber Permanent Identifier or Subscription Permanent Identifier) as an identifier of the UE.

In step S1302, the NG-RAN which has received the registration request message from the UE selects AMF which will serve the UE and then delivers the registration request message to the selected AMF.

In steps S1303 and S1304, the AMF allocates 5G-GUTI to the UE. And, the AMF transmits a registration Accept message, which includes 5G-GUTI, to the UE. The registration Accept message is delivered to the UE through NG-RAN.

In step S1305, since the UE completes a registration to the 5G core network through the first network access, the UE performs a registration through the second network access. Therefore, the UE transmits a registration request message to the 5G core network through a non-3GPP access network. At this time, the registration request message includes 5G-GUIT included in the registration Accept message received in step S1304 as an identifier of the UE.

In step S1306, the N3IWF receives the registration request message transmitted from the UE. The N3IWF may determine the serving AMF of the UE by using 5G-GUTI which is included by the UE. The N3IWF delivers the registration message to the AMF.

In steps S1307 and S1308, the AMF transmits the registration Accept message to the UE. The registration Accept message is delivered to the UE through N3IWF and non-3GPP access network.

FIG. 14 illustrates that 3GPP access and non-3GPP access connected with the UE belong to an identical PLMN in the same manner as FIG. 13. FIG. 14 is different from FIG. 13 in that the UE intends to receive a service through non-3GPP access in a state that the UE already receives a service by being registered in the 5G core network through 3GPP access.

In step S1401, the UE transmits a registration request message to the 5G core network through the NG-RAN. At this time, the registration request message may include SUPI as an identifier of the UE.

In step S1402, the NG-RAN which has received the registration request message from the UE selects AMF which will serve the UE and delivers the registration request message to the AMF.

In steps S1403 and S1404, the AMF allocates 5G-GUTI to the UE. And, the AMF transmits the registration Accept message, which includes 5G GUTI, to the UE. The registration Accept message is delivered to the UE through the NG-RAN.

Afterwards, although not shown in FIG. 14, the UE may receive a service by forming a PDU session.

In step S1405, as the UE moves, the UE should perform a registration update (this may be construed as re-registration over the present invention) according to the movement. This is because that the UE has gotten out of a registration area included in the registration Accept message of step S1404. Although the registration update according to movement of the UE has been described herein, the UE may perform the registration update for various reasons such as an operation for performing a periodic registration update as a registration update timer expires or an operation for performing a registration update as a capability/configuration of the UE is changed.

At this time, the UE is intended to be connected to the 5G core network even through non-3GPP access. Since the 3GPP access and the non-3GPP belong to the identical PLMN, the UE determines to first perform a registration to an access at one side and then perform a registration to an access at the other side. In FIG. 14, it is determined that a registration through 3GPP access is first performed. However, a registration through non-3GPP access may first be performed. In this case, steps S1410 to S1413 are first performed and then steps S1406 to S1409 are performed.

In step S1406, the UE transmits a registration request message to the 5G core network through the NG-RAN. At this time, the registration request message includes 5G-GUTI as an identifier of the UE.

In step S1407, the NG-RAN which has received the registration request message from the UE delivers the registration request message to the serving AMF of the UE.

In steps S1408 and S1409, the AMF transmits the registration Accept message to the UE. The registration Accept message is delivered to the UE through the NG-RAN. The AMF may newly allocate 5G-GUTI for the UE, and at this time, provides the registration Accept message, which includes 5G GUTI, to the UE.

In step S1410, since the UE completes a registration to the 5G core network through the first network access, the UE performs a registration through the second network access. Therefore, the UE transmits a registration request message to the 5G core network through a non-3GPP access network. At this time, the registration request message includes 5G-GUIT received from the AMF after registration through 3GPP access, as an identifier of the UE. This is 5G-GUTI included in the registration Accept message of step S1409 if received in step S1409, and is 5G-GUTI included in the registration Accept message of step S1404 if not so.

In step S1411, the N3IWF receives the registration request message transmitted from the UE. The N3IWF may determine the serving AMF of the UE by using 5G-GUTI included by the UE. The N3IWF delivers the registration request message to the AMF.

In steps S1412 and S1413, the AMF transmits the registration Accept message to the UE. The registration Accept message is delivered to the UE through N3IWF and non-3GPP access network.

FIG. 15 illustrates that the UE is intended to receive a service through a non-3GPP access in a state that the UE already receives a service by being registered in the 5G core network through 3GPP access in the same manner as FIG. 14. However, unlike FIG. 14, FIG. 15 illustrates that 3GPP access and non-3GPP access connected with the UE belong to their respective PLMNs different from each other.

In step S1501, the UE transmits a registration request message to the 5G core network through the NG-RAN. At this time, the registration request message may include SUPI as an identifier of the UE.

In step S1502, the NG-RAN which has received the registration request message from the UE selects AMF which will serve the UE and delivers the registration request message to the AMF, that is, AMF#1.

In steps S1503 and S1504, the AMF#1 allocates 5G-GUTI to the UE. And, the AMF#1 transmits the registration Accept message, which includes 5G GUTI, to the UE. The registration Accept message is delivered to the UE through the NG-RAN.

Afterwards, although not shown in FIG. 15, the UE may receive a service by forming a PDU session.

In step S1505, as the UE moves, the UE should perform a registration update (this may be construed as re-registration over the present invention) according to the movement. This is because that the UE has gotten out of a registration area included in the registration Accept message of step S1504. Although the registration update according to movement of the UE has been described herein, the UE may perform the registration update for various reasons such as an operation for performing a periodic registration update as a registration update timer expires or an operation for performing a registration update as a capability/configuration of the UE is changed.

At this time, the UE is intended to be connected to the 5G core network even through non-3GPP access. Since the 3GPP access and the non-3GPP belong to their respective PLMNs different from each other, the UE does not need to delay a registration to an access at the other side until a registration to an access at one side is completed. Therefore, the UE determines to perform registrations to two accesses simultaneously (or individually or in parallel or independently). Therefore, steps S1506a to 1509a and steps S1506b to S1509b are performed simultaneously.

In step S1506a, the UE transmits a registration request message to the 5G core network through the NG-RAN. At this time, the registration request message includes 5G-GUTI as an identifier of the UE.

In step S1507a, the NG-RAN which has received the registration request message from the UE delivers the registration request message to AMF#1 which is the serving AMF of the UE.

In steps S1508a and S1509a, the AMF#1 transmits the registration Accept message to the UE. The registration Accept message is delivered to the UE through the NG-RAN. The AMF#1 may newly allocate 5G-GUTI for the UE, and at this time, provides the registration Accept message, which includes 5G GUTI, to the UE.

In step S1506b, the UE performs a registration through the second network access regardless of complete registration to the 5G core network through the first network access. Therefore, the UE transmits a registration request message to the 5G core network through a non-3GPP access network.

At this time, the registration request message may include SUPI as an identifier of the UE.

In step S1507b, the N3IWF receives the registration request message transmitted from the UE. The N3IWF selects AMF, that is, AMF#2, which will serve the UE, and then delivers the registration request message to the AMF#2.

In steps S1508b and S1509b, the AMF#2 allocates 5G-GUTI to the UE. And, the AMF#2 transmits the registration Accept message, which includes 5G-GUTI, to the UE. The registration Accept message is delivered to the UE through the N3IWF and the non-3GPP access network.

Although the above description has been based on the initial registration procedure or the registration procedure between the two accesses, the description may be applied to the case that MM(Mobility Management) procedure should not be performed simultaneously between the two accesses.

Figure 16:
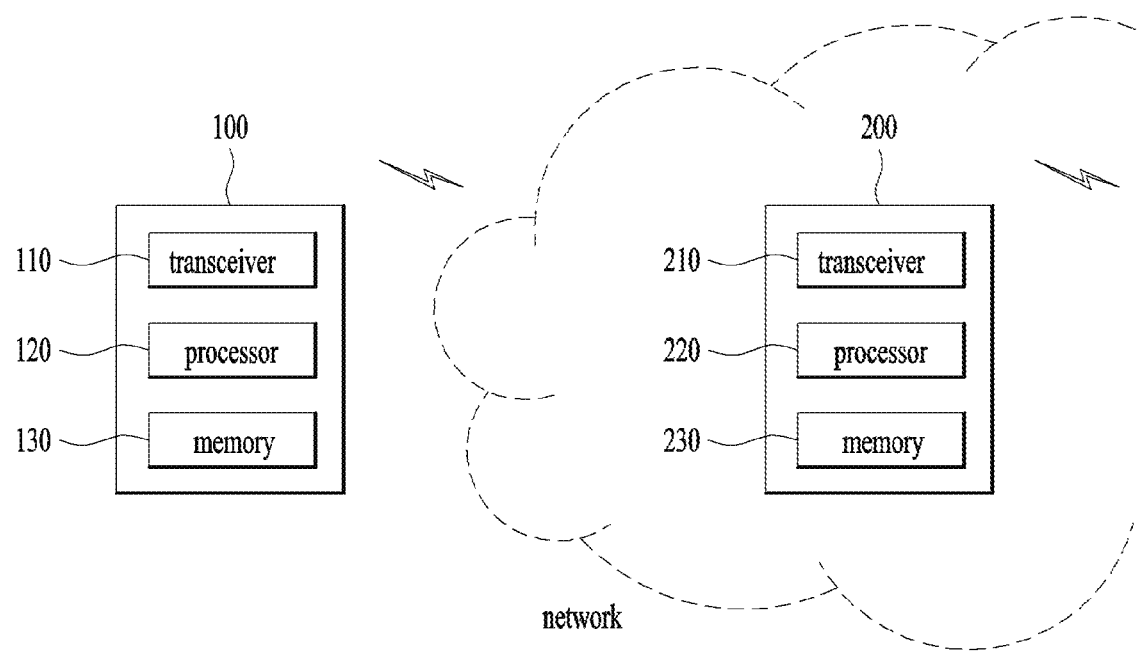
FIG. 16 illustrates a configuration of a node device according to the embodiment of the present invention.

FIG. 16 is a diagram illustrating a configuration of a user equipment and a network node device according to the preferred embodiment of the present invention.

Referring to FIG. 16, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. The memory 130 may store the operation-processed information for a predetermined time, and may be replaced with a buffer (not shown). Also, the processor 120 may be configured to perform a UE operation suggested in the present invention. In detail, the processor 120 performs a registration through a first network access, and performs a registration through a second network access. If the first network access and the second network access belong to an identical PLMN (Public Land Mobile Network), the UE may start the registration through the second network access after the registration through the first network access is completed.

Referring to FIG. 16, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to allow the network node device 200 to perform a function of operation-processing information to be transmitted to and received from the external device. The memory 230 may store the operation-processed information for a predetermined time, and may be replaced with a buffer (not shown). Also, the processor 220 may be configured to perform a network node operation suggested in the present invention.

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may equally be applied to various mobile communication systems.

What is claimed is:

1. A method for performing a registration by a user equipment (UE) in a wireless communication system, the method comprising:
    initiating, by the UE, a first registration to a 5G network through a first network access; and
    initiating, by the UE, a second registration to the 5G network through a second network access only after the first registration through the first network access is completed so that the UE is parallelly connected to the 5G network through both the first network access and the second network access,
    wherein information allocated to the UE during the first registration is reused during the second registration, to select only one Access and Mobility Management Function (AMF) for the UE's parallel connections to the first and second network accesses.

2. The method according to claim 1, wherein the AMF selected from the information allocated during the first registration through the first network access is identical to an AMF selected from the first network access as an AMF of the UE.

3. The method according to claim 1, wherein the AMF selection of the UE is performed by a next generation Node B (gNB) if the second network access is a 3GPP access, and is performed by an N3IWF (Non-3GPP InterWorking Function) if the second network access is a non-3GPP access.

4. The method according to claim 1, wherein the first network access and the second network access are a non-3GPP access and a 3GPP access, respectively, or are a 3GPP access and a non-3GPP access, respectively.

5. The method according to claim 4, wherein the non-3GPP access is a wireless local area network (WLAN) access.

6. The method according to claim 1, wherein the information allocated during the first registration through the first network access is identification (ID) information allocated from the AMF.

7. A UE (User Equipment) for performing a registration in a wireless communication system, the UE comprising:
a transceiver; and
a processor,
wherein the processor initiates a first registration to a 5G network through a first network access, and initiates a second registration to the 5G network through a second network access only after the first registration through the first network access is completed so that the UE is parallelly connected to the 5G network through both the first network access and the second network access, wherein information allocated to the UE during the first registration is reused during the second registration, to select only one Access and Mobility Management Function (AMF) for the UE's parallel connections to the first and second network accesses.

8. The UE according to claim 7, wherein the AMF selected from the information allocated during the first registration through the first network access is identical to an AMF selected from the first network access as an AMF of the UE.

9. The UE according to claim 7, wherein the AMF selection of the UE is performed by a next generation Node B (gNB) if the second network access is a 3GPP access, and is performed by an N3IWF (Non-3GPP InterWorking Function) if the second network access is a non-3GPP access.

10. The UE according to claim 7, wherein the first network access and the second network access are a non-3GPP access and a 3GPP access, respectively, or are a 3GPP access and a non-3GPP access, respectively.

11. The UE according to claim 10, wherein the non-3GPP access is a wireless local area network (WLAN) access.

12. The UE according to claim 7, wherein the information allocated during the first registration through the first network access is identification (ID) information allocated from the AMF.

* * * * *